US006700613B1

(12) United States Patent
Bryant et al.

(10) Patent No.: US 6,700,613 B1
(45) Date of Patent: Mar. 2, 2004

(54) DATA-READING IMAGE CAPTURE APPARATUS, CAMERA, AND METHOD OF USE

(75) Inventors: Robert C. Bryant, Honeoye Falls, NY (US); David J. Nelson, Rochester, NY (US); Jeffrey A. Small, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/097,975

(22) Filed: Jun. 16, 1998

(51) Int. Cl.[7] .......................... H04N 5/225; H04N 5/33; B42P 15/00
(52) U.S. Cl. ...................... 348/342; 348/360; 348/164; 283/88
(58) Field of Search ................................ 348/232, 360, 348/342, 164, 168, 231.2; 358/401, 474; 283/88

(56) References Cited

U.S. PATENT DOCUMENTS

| | | |
|---|---|---|
| 3,416,426 A | 12/1968 | Land |
| 3,666,946 A | 5/1972 | Trimble |
| 4,415,245 A | 11/1983 | Harvey |
| 4,452,843 A | 6/1984 | Kaule et al. |
| 4,572,625 A | 2/1986 | Arndt et al. |
| 4,603,262 A | 7/1986 | Eastman et al. |
| 4,652,750 A | 3/1987 | Eastman et al. |
| 4,679,068 A * | 7/1987 | Lillquist et al. ............... 348/33 |
| 4,820,911 A | 4/1989 | Arackellian et al. |
| 4,914,460 A | 4/1990 | Caimi et al. |
| 4,983,817 A | 1/1991 | Dolash et al. |
| 4,983,996 A | 1/1991 | Kinoshita |
| 5,059,126 A | 10/1991 | Kimball |

(List continued on next page.)

FOREIGN PATENT DOCUMENTS

| | | | |
|---|---|---|---|
| EP | 0 488 177 A2 | 6/1992 | |
| GB | 2 189 800 A | 11/1987 | |
| JP | 61273091 | 12/1986 | |
| JP | 61273091 A | * 12/1986 | ............ H04N/9/04 |
| JP | 01069166 | 3/1989 | |
| JP | 03198483 | 8/1991 | |
| JP | 03088481 | 12/1991 | |
| JP | 10112816 | 4/1998 | |
| WO | WO 96/32689 A | 10/1996 | |

OTHER PUBLICATIONS

Welch Allyn, DCD Products–4400, Feb. 16, 1998, Image Team 4400 Hand Held 2D Image Reader.
Welch Allyn, Image Team 4400 2D Hand–Held Image Reader, User's Guide.
Diffractive Optics, Various Web Pages from the Internet.
Eastman Kodak Company, Koday Digital Science 420 Color Infrared Camera.

*Primary Examiner*—Tuan Ho
*Assistant Examiner*—John Villecco
(74) *Attorney, Agent, or Firm*—Robert Luke Walker

(57) ABSTRACT

A data-reading image capture apparatus, camera, and method of use. The capture apparatus has a digital image detector sensitive to a band of visible radiation and a band of invisible electromagnetic radiation. An optical system, in the capture apparatus, focuses the bands of electromagnetic radiation on the image detector. An image separator is disposed in the capture apparatus, in operative relation to the digital image detector and optical system. The image separator is switchable between an image capture state and a data reading state. The image separator is attenuative for the band of invisible radiation and transmissive for the band of visible radiation in the image capture state. The image separator is attenuative for the band of visible radiation and transmissive for the band of invisible radiation in the data reading state.

35 Claims, 6 Drawing Sheets

U.S. PATENT DOCUMENTS

| | | | |
|---|---|---|---|
| 5,142,299 A | 8/1992 | Braun | |
| 5,212,371 A | 5/1993 | Boles et al. | |
| 5,289,220 A | 2/1994 | Fidler et al. | |
| 5,314,336 A | 5/1994 | Diamond et al. | |
| 5,378,883 A | 1/1995 | Batterman et al. | |
| 5,448,323 A | 9/1995 | Clark et al. | |
| 5,459,317 A * | 10/1995 | Small et al. | 250/341.1 |
| 5,468,949 A | 11/1995 | Swartz et al. | |
| 5,486,944 A | 1/1996 | Bard et al. | |
| 5,502,304 A | 3/1996 | Berson et al. | |
| 5,525,798 A | 6/1996 | Berson et al. | |
| 5,534,696 A * | 7/1996 | Johansson et al. | 250/330 |
| 5,547,501 A | 8/1996 | Maruyama et al. | |
| 5,550,364 A | 8/1996 | Rudeen | |
| 5,591,955 A | 1/1997 | Laser et al. | |
| 5,598,007 A | 1/1997 | Bunce et al. | |
| 5,627,360 A | 5/1997 | Rudeen | |
| 5,644,557 A | 7/1997 | Akamine et al. | |
| 5,666,577 A | 9/1997 | McIntyre et al. | |
| 5,668,364 A | 9/1997 | Swartz et al. | |
| 5,693,693 A | 12/1997 | Auslander et al. | |
| 5,710,834 A | 1/1998 | Rhoads | |
| 5,774,747 A * | 6/1998 | Ishihara et al. | 396/61 |
| 5,781,236 A * | 7/1998 | Shinbori et al. | 348/342 |
| 5,801,763 A * | 9/1998 | Suzuki | 348/77 |
| 5,841,121 A | 11/1998 | Koenck | |
| 5,852,803 A | 12/1998 | Ashby et al. | |
| 5,982,423 A * | 11/1999 | Sekiguchi | 348/216.1 |
| 6,041,195 A * | 3/2000 | Honda et al. | 348/64 |

\* cited by examiner

DATA-READING IMAGE CAPTURE APPARATUS, CAMERA, AND METHOD OF USE

CROSS REFERENCE TO RELATED APPLICATIONS

Reference is made to commonly assigned co-pending U.S. patent applications Ser. No. 08/931,575 and filed in the names of Peter Soscia, Jeffrey Small, Thomas Reiter; Ser. No. 08/959,041 and filed in the name of Peter Soscia; Ser. No. 08/959,036 and filed in the name of Peter Soscia; Ser. No. 09/019,506 and filed in the name of Peter Soscia Ser. No. 09/099,627, now abandoned and filed in the names of Peter Soscia, Jeffrey Small, Thomas Reiter; Ser. No. 09/099, 616 U.S. Pat. No. 6,441,921 and filed in the name of Peter Soscia.

FIELD OF THE INVENTION

The invention relates to image capture apparatus including photographic cameras and more particularly relates to a data-reading image capture apparatus, a data-reading camera, and a method of using the camera.

BACKGROUND OF THE INVENTION

U.S. patent application Ser. No. 08/931,575, filed Sep. 16, 1997, which is hereby incorporated herein by reference, discloses the use of a printed invisible encodement on a photographic image to record sound information. The encodement is read by illuminating using a beam of invisible electromagnetic radiation that is subject to modulation by the encodement. The resulting encodement image is captured, decoded, and played back. The photographic image on which the encodement is printed is originally captured using a camera. The invisible radiation image is captured using a reader that is capable of capturing only invisible images within a selected band. (The term "band" is used herein to refer to one or more contiguous or non-contiguous regions of the electromagnetic spectrum. The term "invisible" is used herein to describe material which is invisible or substantially invisible to the human eye when viewed under normal viewing conditions, that is, facing the viewer and under sunlight or normal room illumination such as incandescent lighting.) The invisible image is produced by development of a photographic emulsion layer, inkjet printing, thermal dye transfer printing or other printing method. The encodement is a one or two-dimensional array of encoded data.

Digital cameras and other visible image capture apparatus utilize a visible light sensitive electrical device. At least some of these light sensitive devices are also sensitive to invisible radiation. Charge coupled devices (CCD's) are so sensitive to infrared radiation that attenuation is required during capture of the visible light image. This is generally accomplished by permanently mounting an infrared blocking filter in the optical system of the camera or other capture device.

It would thus be desirable to provide for capture of visible images and images of invisible encodements without the need for both a camera and a separate encodement reader.

SUMMARY OF THE INVENTION

The invention is defined by the claims. The invention, in its broader aspects, provides a data-reading image capture apparatus, camera, and method of use. The capture apparatus has a digital image detector sensitive to a band of visible radiation and a band of invisible electromagnetic radiation. An optical system, in the capture apparatus, focuses the bands of electromagnetic radiation on the image detector. An image separator is disposed in the capture apparatus, in operative relation to the digital image detector and optical system. The image separator is switchable between an image capture state and a data reading state. The image separator is attenuative for the band of invisible radiation and transmissive for the band of visible radiation in the image capture state. The image separator is attenuative for the band of visible radiation and transmissive for the band of invisible radiation in the data reading state.

It is an advantageous effect of at least some of the embodiments of the invention that a data-reading image capture apparatus, a data-reading camera, and a method of using the camera are provided which allow for capture of visible images and images of invisible encodements without the need for both a camera and a separate encodement reader.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 4:
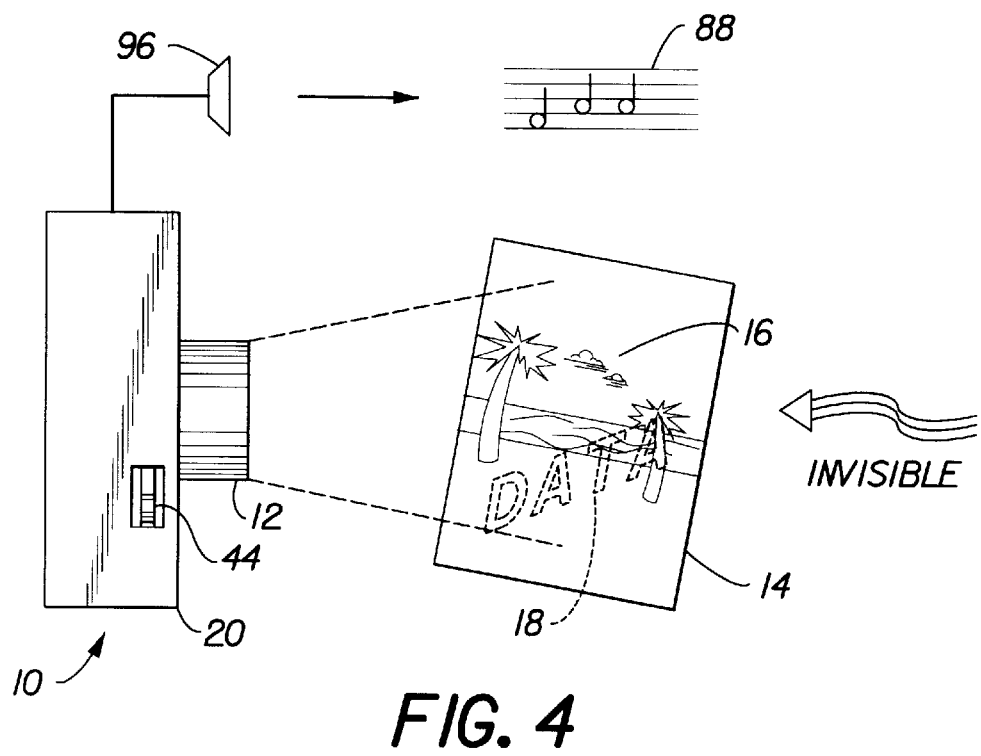
FIG. 4 is a diagrammatical view illustrating use of the camera of FIG. 1 to read invisible printed data on a photographic print and playback recorded sound.
Figure 9:
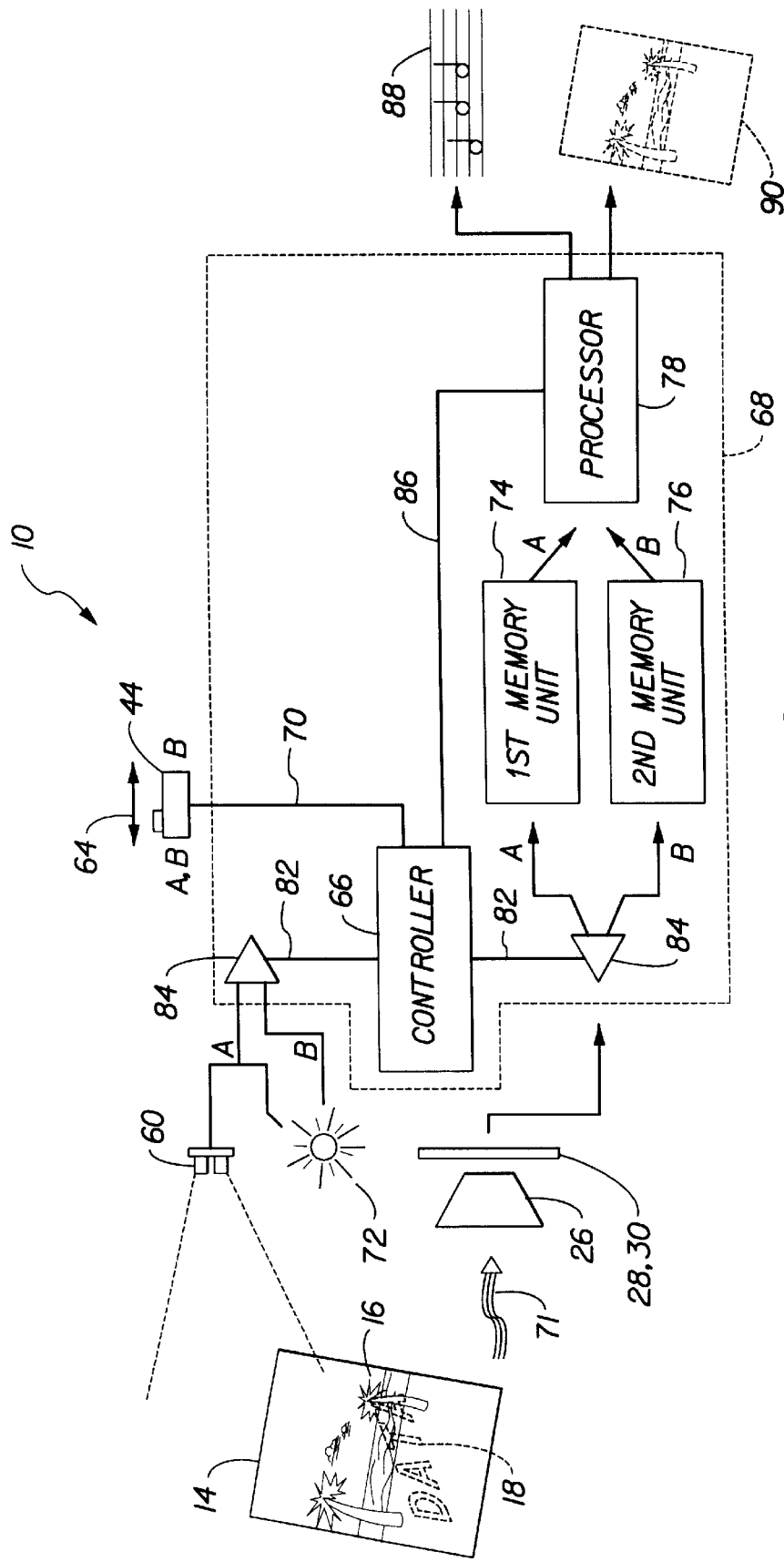
FIG. 9 is a diagrammatical view showing use of another embodiment of the camera of the invention to read invisible printed data on a photographic print and playback recorded sound.

The data-reading image capture apparatus 10 is a camera, scanner, or other imager that has an exposure system 12 that can capture both a visible radiation image and a second image, separate from the visible radiation image. The captured second image is invisible; that is, the second image is formed by radiation in a band outside the visible spectrum. The second image is reflection, transmission, or luminance from an invisible layer that overlies a visible image. The visible image can be limited to an underlying substrate without information content, but ordinarily would be printed information, in the form of pictorial information, text or other alphanumeric information, or non-alphanumeric indicia. The nature, content, and manner of preparation of the printed image is not critical. The invisible layer can simply be a pictorial image or indicia, but is preferably in the form of a data encodement. For convenience, the capture of the invisible second image is also sometimes referred to herein by the term, "data reading" and similar terms. For example, a camera of the invention can be used to both photograph a subject and to read data invisibly imprinted on a photograph print. (This is illustrated in FIGS. 4 and 9 as a sheet 14 bearing a visible printed image 16 of a pair of trees. The word "DATA" appears in dashed lines, to represent the invisible encodement 18.) The data in the encodement can include subject specific information, such as sound recorded when the picture was taken, for playback at the time of viewing the photographic print or other use. The form of the encoded data is not critical to the invention. For example, the encodement can be in accordance with Standard PDF 417 and the LS49042D Scanner System marketed by Symbol Technologies, Inc., of Holtsville, N.Y.; or the encodement scheme marketed as Paper Disk by Cobblestone Software, Inc., of Lexington, Mass.

The invention is discussed herein generally in terms of a camera 10, that is, a portable general purpose image capturing apparatus; but it will be understood that equivalent features are intended for other data-reading image capture apparatus, such as flatbed and media transport scanners. The invention is also discussed herein generally in terms of a visible radiation image and an invisible encodement. The visible image can include a small percentage of invisible radiation (also referred to herein as an "invisible component"). Similarly, the invisible encodement is preferably fully invisible under ordinary viewing conditions, but can include a small percentage of visible radiation (also referred to herein as a "visible component"). An invisible component of the visible image is a inconsequential unless the component is in the same radiation band as the invisible encodement. In that case, the invisible component can act as background noise and reduce the signal to noise ratio of the invisible encodement. The amplitude of the invisible component should be insufficient to measurably degrade a digital image produced from the invisible encodement when the invisible encodement is read. Any visible component of the invisible encodement should, preferably, be imperceptible to the viewer under ordinary viewing conditions; but slight degradation of the image may be acceptable under some conditions.

The invisible encodement can absorb the invisible radiation or can reflect and/or emit the invisible radiation. The frequency range or ranges of the invisible radiation is dependent upon the characteristics of the material used for the invisible encodement. Depending upon the material, infrared radiation or ultraviolet radiation or both can be used. High frequency ultraviolet radiation and radiation of higher frequency is not preferred in current embodiments for reasons of safety. Infrared radiation is preferred over ultraviolet for the same reason.

Figure 1:
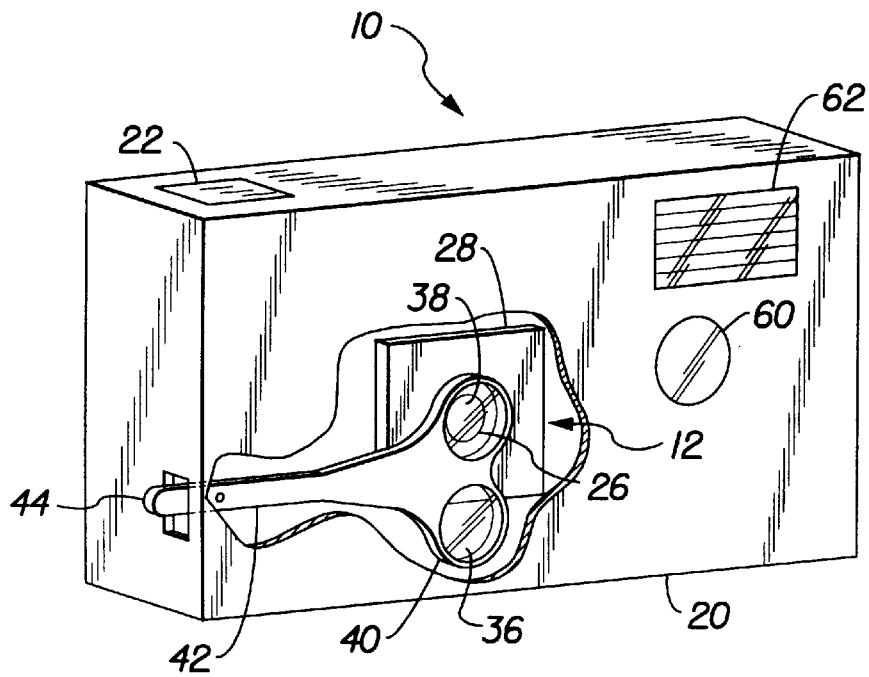
FIG. 1 is a semi-diagrammatical perspective view of an embodiment of the camera of the invention. The filter holder is in a visible image capture position.
Figure 2:
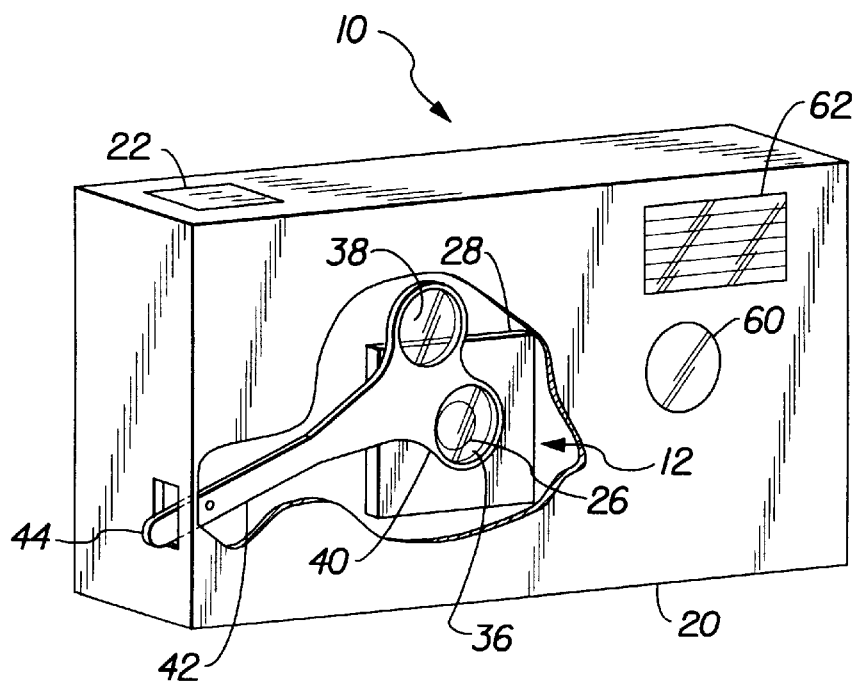
FIG. 2 is the same view as FIG. 1, but the filter holder is shown in a data-reading position.

Referring now to FIGS. 1–2, a camera 10 includes the exposure system 12, a body 20 supporting the exposure system 12, and a control interface accessible from the outside of the body 20 for controlling the exposure system 12. The control interface includes a shutter button 22. The exposure system 12 includes a capture unit 24 and an optical system 26 (illustrated in FIGS. 1–2 as a circle) that focuses electromagnetic radiation on the capture unit 24.

The capture unit 24 includes a digital image detector 28 that is sensitive to a band of visible radiation and a band of invisible electromagnetic radiation. The digital image detector 28 is used to capture the invisible second image. The digital image detector 28 comprises one or more radiation-sensitive electrical devices which convert an impinging radiation beam into a digital image, that is, an electrical signal from which a two dimensional image can be reconstructed. It is currently preferred to use light-sensitive electrical devices that are sensitive to a broad band of radiation including all or most of the visible spectrum and a selected band of invisible radiation. For example, widely available charge coupled devices (CCD's) are sensitive to visible radiation and a broad band of infrared radiation. The light-sensitive electrical device can also be a charge injection device, a photodiode, a CMOS imager, or another type of photoelectric transducer.

The digital image detector 28 can include one or more two-dimensional light-sensitive electrical devices, or one or more two dimensional arrays of such devices, or one or more one-dimensional arrays of such devices. With one-dimensional arrays, the detector includes means, well known to those of skill in the art, for scanning the incident beam to provide a two-dimensional digital image. Two-dimensional devices are preferred over one dimensional devices and the use of single discrete devices is currently preferred over the use of arrays of smaller devices for reasons of image quality and ease of assembly. It is well known in the art to use a single two-dimensional capture device with a pixellated three-color filter for color visible image capture. It is also well known to use three two-dimensional devices with a beam splitter and individual colored filters. The use of the single two-dimensional capture device is preferred for reasons of economy. An example of a suitable digital image detector 28 comprises a single CCD, such as a charge coupled device marketed by Eastman Kodak Company of Rochester, N.Y. as Model No. KAF-6300. Lower resolution digital image detectors can also be used, such as a VGA (video graphics array) sensor having a resolution of 640 by 480 pixels. If desired, the camera of the invention can be prepared by modifying an existing digital camera, such as a DCS-210, marketed by Eastman Kodak Company of Rochester, N.Y., to add a filter holder (described in detail below).

Figure 7:
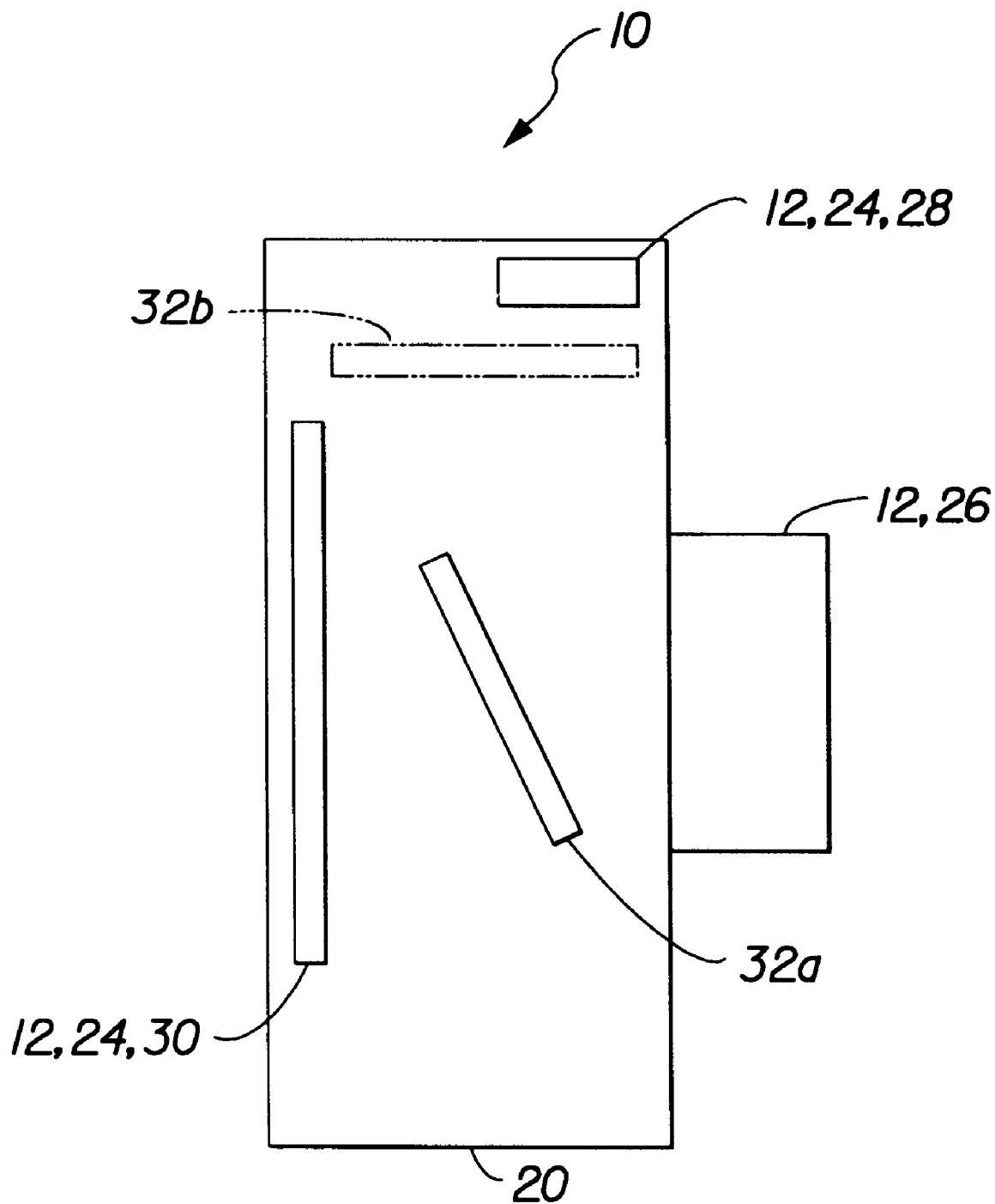
FIG. 7 is a semi-diagrammatical view of another embodiment of the camera of the invention.

The digital image detector 28 can be used for capture of the visible image. In this case, the digital image detector 28 is utilized for visible image capture in the same manner as in the various digital cameras well known to those of skill in the art. Alternatively, a visible image capture component 30 can be used. The visible image capture component 30 can be digital, using the same kinds of components as previously described for the digital image detector 28; or can utilize photographic film, as shown in FIG. 7. Suitable photographic film camera features, such as exposure, film metering, and film transport mechanisms, are well-known to those of skill in the art.

The exposure system 12 of the capture apparatus 10 includes an image separator 32, for separating the visible light and invisible radiation images. The image separator 32 can be in the form of one or more digital computer programs or subroutines (hereafter "software"), or can be limited to physical features of the capture apparatus 10, such as optical filters, or can combine physical features and software. Depending upon intended usage, the image separator 32 can switch automatically between visible image capture and data reading states or can be selectively alternated by the user. For a camera 10, selective alternation by the user is preferred. The manner of alternating the states is not critical, but should not interfere with usage of the capture apparatus 10 in either state. For example, optical filters can be alternated by detachment and reattachment or, more preferably, by use of any of a wide variety of linear and rotary motion mechanisms to move the filters.

In the camera of FIG. 7, the image separator 32 is a mirror that, in a first position 32a (indicated by solid lines), directs light to the digital image detector 28; and, in a second position 32b (indicated by dashed lines), directs light to photographic film or digital visible image capture component 30. Suitable mirror mechanisms are well known to those of skill in the art, since similar mirror mechanisms are used in single lens reflex cameras. A fixed half-silvered mirror could also be used. The image separator 32 of FIG. 7 is not preferred since it is relatively complex and requires separate invisible and visible light detectors 28,30, respectively.

Figure 5:
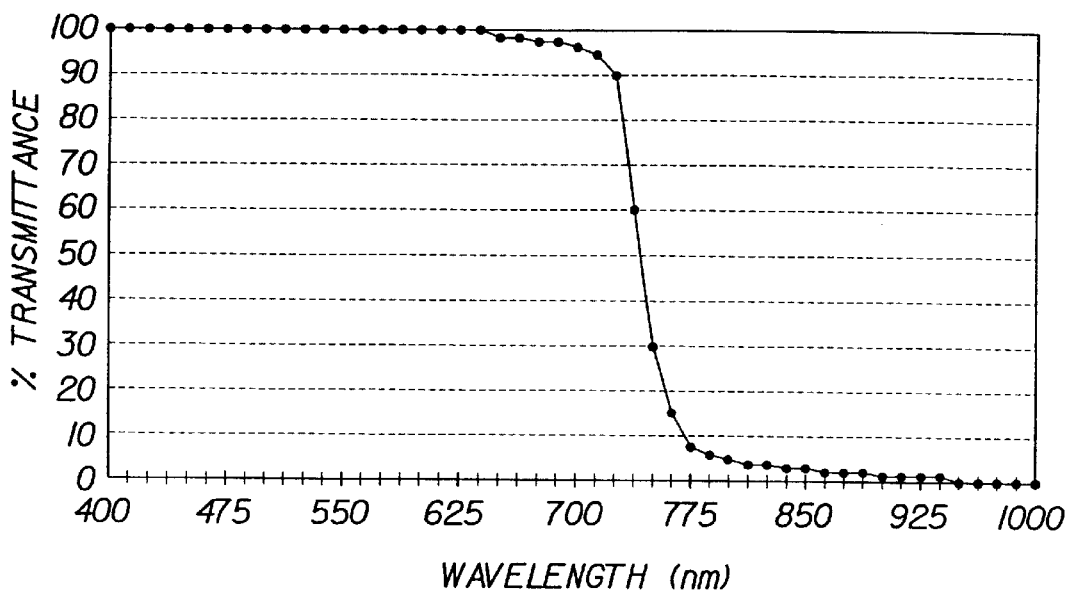
FIG. 5 is a graph of percent maximum transmittance vs. wavelength for an infrared blocking filter suitable for use with the camera of FIG. 1.
Figure 6:
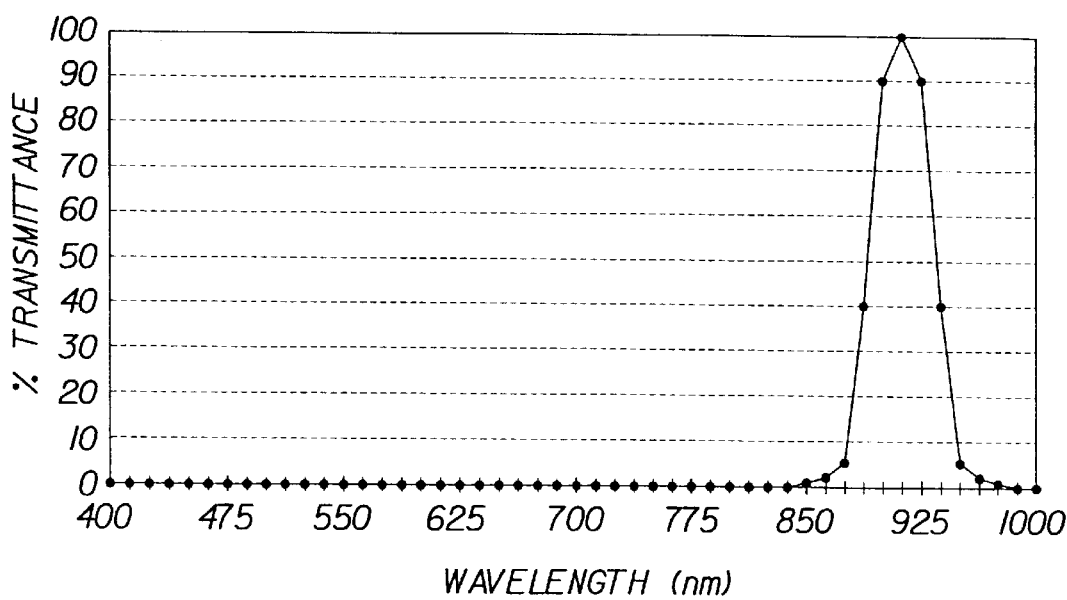
FIG. 6 is a graph of percent maximum transmittance vs. wavelength for an infrared band pass filter suitable for use with the camera of FIG. 1.

In another embodiment of the invention, the image separator 32 uses one or more optical filters. This approach is simple and relatively inexpensive and is therefore currently preferred. Referring to FIGS. 1 and 2, in order to separate out the invisible image, the image separator 32 includes a data filter 36 attenuative for the band of visible radiation to which the digital image detector 28 is sensitive and transmissive for the band of invisible radiation. The image separator 32 also includes an image filter 38 attenuative for the band of invisible radiation and transmissive for the band of visible radiation. If the band of invisible information is infrared, then the data filter 36 is an infrared bandpass filter and the image filter 38 is an infrared blocking filter. Simplified absorption spectra for an infrared blocking filter and an infrared bandpass filter are shown in FIGS. 5 and 6, respectively. Examples of suitable optical filters are an infrared blocking filter, Model No. 58893, marketed by Oriel Corporation of Stratford, Conn.) and infrared bandpass filter, Model No. 54020, also marketed by Oriel Corporation.

The image and data filters 36,38 are interposed in operative relation to the detector 28, alternately, for visible image capture and data reading, respectively. The image filter 38 can be optional if the capture component 30 uses photographic film for visible image capture; since ordinary color and black-and-white photographic films, under most conditions, do not absorb well outside the visible spectrum. Under some conditions, such as with high intensity ultraviolet exposure or infrared exposure and infrared film; the use of an image filter 38 would be required or highly desirable.

Referring to the embodiments shown in FIGS. 1–2, image and data filters 36,38 are each fixed to a filter holder 40 and are pivoted back and forth about an axis, by an actuator 42, such as a servomotor or mechanical linkage or lever arm. Camera 10 includes an external selector 44 that is operatively connected to the actuator 42 (such as, wired in an appropriate circuit for the servomotor or physically joined) to move the filter holder 40 between image capture and data reading positions.

Figure 8A:
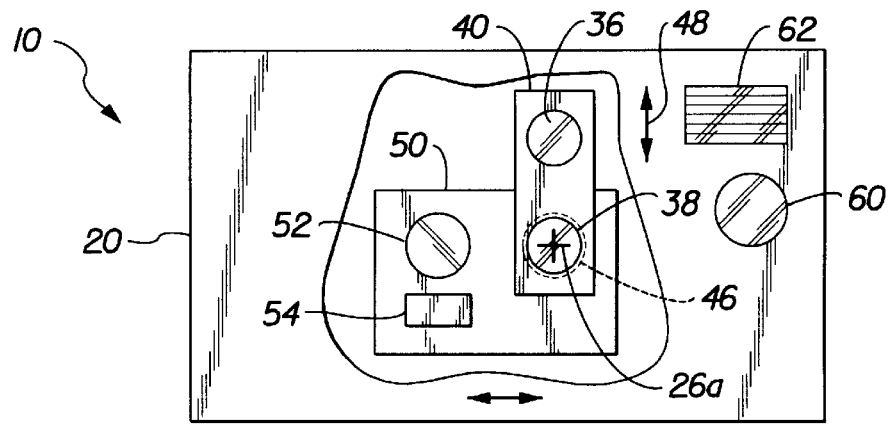
FIG. 8a is a partial front view of still another embodiment of the camera of the invention. The filter holder is shown in a visible image capture position. The secondary filter mount is shown in a close-up filter position.
Figure 8B:
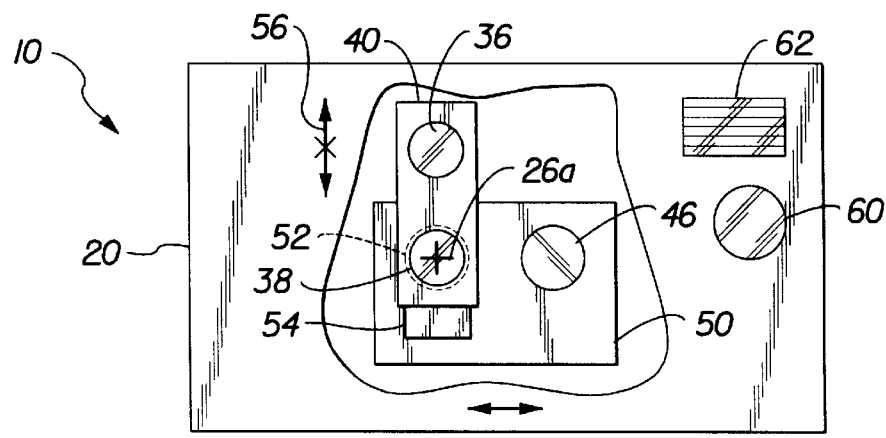
FIG. 8b is the same view as FIG. 8a, except the secondary filter mount is in a normal lens position. The filter holder is shown in the visible image capture position.
Figure 8C:
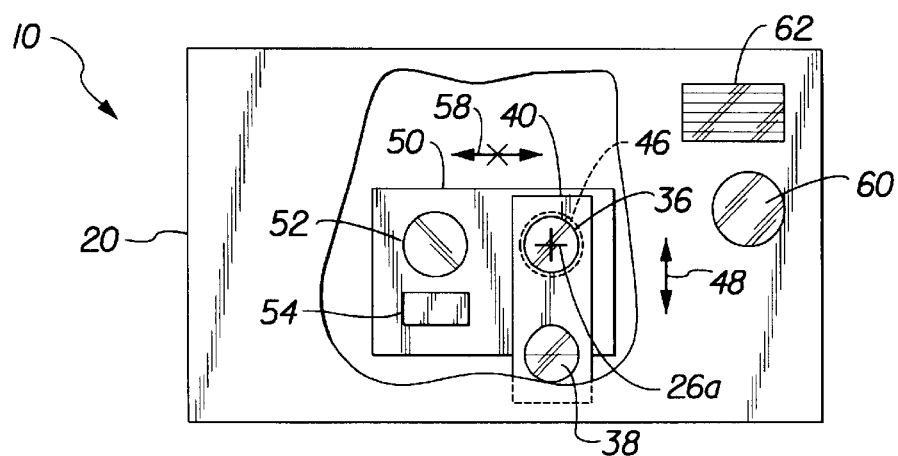
FIG. 8c is the same view as FIG. 8a, except the filter holder is in a data-reading position. The secondary filter mount is in the close-up filter position.

The camera or other image capture apparatus 10 can include a variety of other features for convenience and ease of use. Many cameras have a lens that does not focus well in the distance range which is likely to be used for data reading. In such a camera 10, a close-up filter 46 (sometimes referred to as a "close-up lens") shown in FIGS. 8a–8c, can be provided so as to be interposable in the optical system (illustrated in FIGS. 8a–8c by a cross indicating the position of the optical axis 26a) in tandem with the data filter 36. The close-up filter 46 can be fixed to the data filter 36 or can be mounted so as to be required for use of the data filter 36 and optional with the image filter 38. Referring to FIGS. 8a–8c, a filter holder 40 includes the image filter 38 and the data filter 36. The filter holder 40 is mounted to the camera body 20 and is movable between an upper position and a lower position, as indicated by double-headed arrow 48, in FIGS. 8a and 8c, to alternately interpose the image filter 38 and data filter 36 in the optical system 26 of the camera 10. A filter mount 50 is also joined to the body 20. The filter 50 is movable, perpendicular to the directions of motion of motion of the filter holder 40, between left and right positions. In the left position, a close-up filter 46, mounted on the filter mount 50, is interposed in the optical system 26. In the right position, a normal window 52 is disposed over the optical system 26. The normal window 52 allows the optical system 26 to function in a "normal" mode (subject matter at a moderate to long focusing distance). The normal window 52 can be an opening or can be part of the optical system 26, that is, a "normal" lens, or can be an accessory, such as a protective window, an auxiliary filter (such as a sky or ultraviolet blocking filter) or the like. The filter mount 50 includes a stop 54 that allows use of the data filter 36 without the close-up filter 46. (Blocked motions of the filter holder 40 and filter mount 50 are indicated by crossed-out double headed arrows 56,58 in FIGS. 8b and 8c, respectively. The stop 54 does not prevent use of the visible image filter 38 with either the close-up filter 46 or the normal window 52. This permits the use of camera 10 to capture normal distance and close-up pictorial images. Camera 10 can also capture visible barcodes and the like, using the visible image filter 38 and close-up filter 46.

Camera 10 can include an invisible radiation illumination source 60 for the band of invisible electromagnetic radiation, such as an infrared illuminator. Camera 10 can also include a visible light illumination source 62 for the visible image, such as a flash unit. A wide spectrum illuminator can be used instead of separate sources 60,62 for illumination for both visible image capture and data reading. Suitable illumination sources, power supplies and related features are well known to those of skill in the art. An example of an illumination source 60 usable for data capture is a commonly available infrared emitter with a peak wavelength at 880 nm, such as Part No. MTE2050-OH1 marketed by MarkTech Optoelectronics of Latham, N.Y. The camera or other image capture apparatus 10 can have a wide variety of other features present in known cameras and other capture apparatus.

FIG. 9 illustrates features and use of another embodiment of the camera 10 that includes a digital image separator 32. The image separator 32 includes a selector 44 that can be manually alternated (illustrated by double-headed arrow 64) by the user to change the image separator 32 between visible image capture and data reading states. For data reading, the user first switches to the appropriate state and then points the camera 10 at the target, that is, the visible image 16 bearing the invisible encodement 18. This is done under ordinary lighting conditions of daylight or ordinary artificial illumination or some combination of the two. A controller 66 of a control and processing unit 68 receives a status signal from the selector 44 (via by control line 70) and changes to the respective state. Controllers 66 in the form of microprocessors and other components of the control and processing unit 68 are well known to those of skill in the art.

The user then actuates camera 10. The shutter button 22 (shown in FIGS. 1–2) can be used to actuate camera 10 or a separate button or switch (not shown) can be used to actuate camera 10 in the data reading state, if desired. The controller 66, in response to the actuation, activates an invisible radiation illumination source 60 and causes the digital image detector 28 to capture an image of the target (symbolized in FIG. 9) by a broad arrow 71) in a combination of the supplied invisible radiation and ambient lighting 72 (symbolized in FIG. 9 by a sun symbol.). The resulting extended spectrum image is stored in a first memory unit 74. Before or after this capture, the controller 66 causes the digital image detector 28 to capture another image 71 of the target, while the invisible radiation illumination source 60 is deactivated. The resulting visible light only image is stored in a second memory unit 76. These two capture events are illustrated in FIG. 9 by pairs of paths, each labelled "A" and "B" to sources of illumination and to and from memory storage units. Control lines 82 from the controller 66 link to switches 84 (logical or physical or a combination) for the alternate paths A and B.

The extended spectrum and visible light images are combined in a processor 78. The processor 78 can be subject to a common controller 66 via a control line 86. The visible light only image is subtracted from the extended spectrum image to provide an invisible radiation image which is processed as necessary to retrieve encoded information, and output. (The data output 88 is symbolized as a series of musical notes.) A digitized visible light image 90 (indicated by dashed lines) is also available and can be processed and output as desired. For visible image capture, the selector 44 is changed to the "B" position and only the "B" capture and processing path is utilized to provide a visible light only image 90.

The digital image separator 32 is preferably used under conditions in which there is little invisible radiation in the ambient visible lighting. Under such conditions, an advantage in signal to noise ratio can be provided, relative to optical filters.

Figure 3:
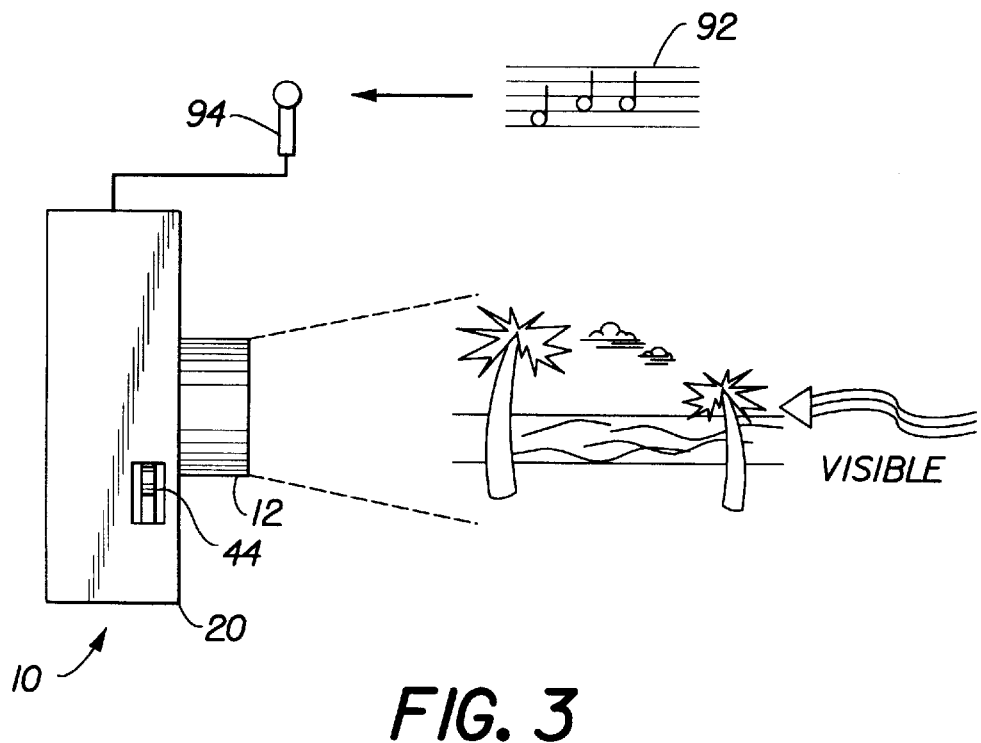
FIG. 3 is a diagrammatical view illustrating use of the camera of FIG. 1 to capture a visible image and record sound data.

Camera 10 is used by first selecting for data reading or photography and adjusting the selector 44 to the appropriate state. When the visible image state is selected, the camera 10 is used for photography and, if desired, for recording of non-image data. Following capture, the captured image or images are processed (chemically or digitally) and visible depictions of captured visible light images are printed (optically or digitally). An invisible encodement of data, secondary to the visible image; can be printed on the photographic print. Since the encodement is invisible, all or part of the encodement can overlie the printed image. In the embodiment shown in FIGS. 3–4, sound or other input 92 (symbolized as a series of musical notes) is recorded contemporaneously with picture taking, using a microphone or other input device 94, such that an invisible encodement of the sound can be printed on the front surface of a resulting photographic print.

When the data reading camera state is selected from the alternatives of the visible image state and the data reading camera state, camera 10 is configured to admit invisible radiation in a preselected band and filter out visible radiation. The invisible encodement 18 is illuminated with a beam of invisible radiation. The encodement 18 modulates the beam producing a transmitted or reflected image of the encodement, which is digitally photographed. The resulting digital image is processed by an output system resulting in a unit of digital data. The manner of processing to produce and later utilize the digital data is not critical to the invention. The output system can store the processed digital data, or transmit the digital data in some manner to a sound system or other output device 96 to playback all or part of the processed digital data to the user, or provide some combination of these functions, on an immediate or delayed basis. (Playback is illustrated in FIG. 4 by a symbol in the form of a series of musical notes.) Components to provide any or all of these functions are well known to those of skill in the art. For example, decodement methods and components are available for the encodement schemes previously mentioned.

The separation of digital data processing from storage, transmission, and display; is a matter of logical convenience in this explanation. It will be understood that digital data processing need not be limited to a single component and processing, control, storage, transmission, and display functions can be supplied by a variety of equipment in a variety of manners. For example, in the embodiments shown in FIGS. 3–4, the digital data is played back by a digital sound playback system through a speaker. Other audio or visual or textual information can be played back or displayed in a similar manner. The digital data can be used for control or archival purposes. Multiple uses can be made of the same unit of digital data.

The invention has been described in detail with particular reference to certain preferred embodiments thereof, but it will be understood that variations and modifications can be effected within the spirit and scope of the invention.

What is claimed is:

1. A data-reading image capture apparatus comprising:
    a digital image detector sensitive to a band of visible radiation and a band of invisible electromagnetic radiation;
    an optical system focusing said bands of electromagnetic radiation on said image detector;
    an image separator disposed in operative relation to said digital image detector and said optical system, said image separator being switchable between an image capture state and a data reading state, said image separator being attenuative for said band of invisible radiation and transmissive for said band of visible radiation in said image capture state, said image separator being attenuative for said band of visible radiation and transmissive, in close up relative to said visible radiation in said image capture state, for said band of invisible radiation in said data reading state.

2. The capture apparatus of claim 1 wherein said image separator further comprises:
    an image filter attenuative for said band of invisible radiation and transmissive for said band of visible radiation; and
    a data filter attenuative for said band of visible radiation and transmissive for said band of invisible radiation;
    said image and data filters being separately interposable in operative relation to said detector, for image capture and data reading, respectively.

3. The capture apparatus of claim 1 further characterized as comprising:
    a digital image detector sensitive to a band of visible radiation and a band of invisible electromagnetic radiation, said digital image detector outputting an imaging signal;

an optical system focusing said bands of electromagnetic radiation on said image detector;

a digital image separator operative on said imaging signal, said image separator being switchable between an image capture state and a data reading state, said image separator being attenuative for said band of invisible radiation and transmissive for said band of visible radiation in said image capture state, said image separator being attenuative for said band of visible radiation and transmissive for said band of invisible radiation in said data reading state.

4. The capture apparatus of claim 1 further comprising an illumination source for said band of invisible electromagnetic radiation.

5. The capture apparatus of claim 1 wherein said image separator includes an infrared blocking filter and an infrared bandpass filter.

6. The capture apparatus of claim 5 further comprising an infrared illuminator.

7. The capture apparatus of claim 1 further comprising a selector operatively connected to said image separator, said selector alternating manually to switch said image separator between said image capture state and said data reading state.

8. A camera comprising:

a selector changeable between a visible light state and an invisible radiation state; and an exposure system capable of capturing, on exposure to a target having a visible radiation image and a second radiation image from a band of invisible electromagnetic radiation:

only said visible radiation image when said selector is in said visible light state, and only a close-up, relative to said visible radiation image, of said second radiation image from a band of invisible electromagnetic radiation when said selector is in said invisible radiation state.

9. The camera of claim 8 further comprising an illumination source for said band of invisible electromagnetic radiation.

10. The camera of claim 9 wherein said illumination source is an infrared illuminator.

11. The camera of claim 9 further comprising a visible light illuminator.

12. A camera comprising:

a selector changeable between a visible light state and an invisible radiation state; and an exposure system capable of capturing: a visible radiation image when said selector is in said visible light state, and a second radiation image from a band of invisible electromagnetic radiation when said selector is in said invisible radiation state, said exposure system including:

a digital image detector sensitive to a band of visible radiation and said band of invisible electromagnetic radiation;

a data filter mounted to said camera, said data filter being attenuative for said band of visible radiation and transmissive for said band of invisible radiation;

a close-up filter mounted to said camera, said data filter and said close-up filter both being interposed in operative relation to said detector when said selector is in said invisible radiation state, said data filter being disposed in non-operative relation to said detector when said selector is in said visible light state, said close-up filter being disposable in non-operative relation to said detector; and an optical system focusing light on said detector, said optical system having a first focusing distance when said close-up filter is in said non-operative relation to said detector and a second focusing distance when said close-up filter is in said operative relation to said detector, said first focusing distance being greater than said second focusing distance.

13. A camera comprising:

a selector changeable between a visible light state and an invisible radiation state; and an exposure system capable of capturing: a visible radiation image when said selector is in said visible light state, and a second radiation image from a band of invisible electromagnetic radiation when said selector is in said invisible radiation state, said exposure system including:

a digital image detector sensitive to a band of visible radiation and said band of invisible electromagnetic radiation;

a data filter mounted to said camera, said data filter being attenuative for said band of visible radiation and transmissive for said band of invisible radiation;

a close-up filter mounted to said camera, said data filter and said close-up filter both being interposed in operative relation to said detector when said selector is in said invisible radiation state, said data filter being disposed in non-operative relation to said detector when said selector is in said visible light state; and an optical system focusing light on said detector;

wherein said exposure system further comprises an image filter attenuative for said band of invisible radiation and transmissive for said band of visible radiation, said image and close-up filters being separately interposable in operative relation to said detector, for visible image capture and data reading, respectively.

14. The camera of claim 13 wherein said image and data filters are optical filters alternately interposable in said optical system.

15. The camera of claim 14 wherein said image filter is an infrared blocking filter and said data filter is an infrared bandpass filter.

16. The camera of claim 13 wherein said digital image detector outputs an imaging signal and said data filter further comprises a digital filter operative on said imaging signal.

17. The camera of claim 13 wherein said exposure system includes a photographic film exposure unit.

18. The camera of claim 13 wherein said selector is manually changeable.

19. A method of using a data-reading camera, comprising the steps of:

selecting one of alternative visible image and invisible image camera states;

digitally capturing a light image to produce a digital image, said light image being a visible light image when said camera is in said visible image camera state, said light image being an encodement image when said camera is in said invisible image camera state;

during said capturing when said camera is in said invisible image camera state, illuminating an invisible printed encodement with a beam of invisible radiation to produce said encodement image, said radiation being within a band subject to modulation by said printed encodement;

filtering visible light from at least one of said encodement image and said digital image, when said camera is in said invisible image camera state; and retrieving encoded information from said digital image only when said camera is in said invisible image camera state.

20. The method of claim 19 wherein said invisible radiation is infrared radiation.

21. The method of claim 20 wherein said selecting of said invisible image camera state further comprises moving a close-up lens to an operative position.

22. The method of claim 19 wherein said selecting is manual.

23. A camera comprising:
   an external selector changeable between a visible light state and an invisible radiation state;
   a digital image detector outputting an imaging signal responsive to a band of visible radiation and a band of invisible electromagnetic radiation;
   a data filter including a digital filter operative on said imaging signal, said data filter being attenuative for said band of visible radiation and transmissive for said band of invisible radiation, said data filter being interposed in operative relation to said detector when said selector is in said invisible radiation state;
   an image filter attenuative for said band of invisible radiation and transmissive for said band of visible radiation, said image filter being interposed in operative relation to said detector when said selector is in said visible light state; and
   a close-up filter interposed in operative relation to said detector when said selector is in said invisible radiation state, said close-up filter being selectively disposable in operative relation to said detector when said image separator is in said image capture state.

24. A method of using a data-reading camera, comprising the steps of:
   selecting one of an invisible radiation camera state and a visible image camera state;
   capturing a first photographic image when said camera is in said visible image camera state and a second photographic image when said camera is in said invisible radiation camera state, said second photographic image being in close-up relative to said first photographic image; and
   retrieving encoded information from said image only when said camera is in said invisible radiation camera state.

25. The method of claim 24 further comprising filtering visible light from said photographic image following said selecting of said invisible radiation camera state.

26. The method of claim 25 further comprising illuminating an invisible printed encodement with a beam of infrared radiation to produce an encodement image, said radiation being within a band subject to modulation by said printed encodement, and wherein said capturing is further characterized as capturing said encodement image as a photographic image.

27. The method of claim 24 further comprising the steps of:
   inputting secondary, non-image data contemporaneously with said capturing of said first photographic image; and
   recording said secondary data.

28. The method of claim 27 wherein said invisible printed encodement is an encodement of said secondary data and said retrieving further comprises decoding said encodement.

29. The method of claim 28 wherein said data is digitized sound and said method further comprises playing back said sound.

30. A data-reading image capture apparatus comprising:
   a digital image detector sensitive to a band of visible radiation and a band of invisible electromagnetic radiation;
   an optical system focusing said bands of electromagnetic radiation on said image detector;
   an image separator disposed in operative relation to said digital image detector and said optical system, said image separator being switchable between an image capture state and a data reading state, said image separator being attenuative for said band of invisible radiation and transmissive for said band of visible radiation in said image capture state, said image separator being attenuative for said band of visible radiation and transmissive for said band of invisible radiation in said data reading state;
   a selector operatively connected to said image separator, said selector alternating manually to switch said image separator between said image capture state and said data reading state; and
   a close-up filter interposed in operative relation to said detector when said image separator is in said data reading state, said close-up filter being disposable in non-operative relation to said detector only when said image separator is in said image capture state.

31. The capture apparatus of claim 30 wherein said close-up filter is selectively disposable in said operative relation to said detector when said image separator is in said image capture state.

32. The capture apparatus of claim 31 wherein said filters are optical filters, said image and data filters are alternately interposable in said optical system, and said close-up filter is interposable in said optical system in tandem with said data filter.

33. The capture apparatus of claim 30 wherein said close-up filter is switchable between said operative relation to said detector and said non-operative relation to said detector in tandem with said image separator.

34. The capture apparatus of claim 30 wherein said close-up filter is joined in fixed relation to said data filter.

35. A camera comprising:
   a selector changeable between visible image capture and data reading;
   a digital image detector outputting an imaging signal responsive to visible radiation and to a band of invisible electromagnetic radiation;
   image and data filters separately interposable in operative relation to said detector, said image filter being operative during said visible image capture, said data filter being operative during said data reading, said image filter being attenuative for said band of invisible radiation and transmissive for said band of visible radiation, said data filter being attenuative for said band of visible radiation and transmissive for said band of invisible radiation; and
   a close-up filter interposable in operative relation to said detector; said data and close-up filters both being operative during said data reading.

* * * * *